INVENTORS
BRUCE I. BERTELSEN
NICHOLAS THEODOSEAU 3,244,857

VAPOR DEPOSITION SOURCE

Bruce I. Bertelsen, Poughkeepsie, and Nicholas Theodoseau, Staatsburg, N.Y., assignors to International Business Machines Corporation, New York, N.Y., a corporation of New York Filed Dec. 23, 1963, Ser. No. 332,587
1 Claim. (Cl. 219—275)

The present invention relates to vapor deposition apparatus and more specifically to a vapor deposition source for thermally subliming various materials in a vacuum for coating purposes.

With the ever increasing trend toward microminiaturization in the electronics field, i.e., toward the realization of electronic circuits, subsystems, or entire systems from extremely small electronic components, greater emphasis is being placed on developing techniques and apparatus which will ultimately lead to low cost, high reliability, and improved performance. In conjunction with this general effort toward advancing the state of the art in the field of electronic microminiaturization, a great deal of resources in terms of time, money, and manpower has been expended in attempts to improve the deposition of thin films on supporting substrates. It is necessary to consider only a few of the many applications of thin films in component fabrication to realize its importance. For example, thin films of magnetic material have enjoyed successful use as memory elements. Frequently, electrical conductors in the form of leads, terminals, capacitor plates, and electrodes are fabricated by thin film techniques. More often than not, insulating surfaces are formed of thin films of dielectric material. And, thin films have been widely used in the manufacturing processes for transistors and semiconductor diodes. Thus, it is seen that thin films play an essential part in the microminiaturization of electronic components.

Numerous techniques for forming thin films in electronic applications have been tried at different times with varying degrees of success. Some of these techniques are: thermal oxidation, diffusion, alloying, spraying, printing, vapor decomposition, chemical plating, electroplating, cathode sputtering, reactive vacuum evaporation, and vacuum evaporation. Of these various techniques, experience of recent years has pointed toward the adoption of vacuum evaporation as a suitable, in fact, highly desirable technique for depositing thin films. The ability to efficiently deposit at high rates while still maintaining uniformity, high quality, chemical stability, and purity has in part been responsible for this trend toward vacuum deposition of thin films. By the term thin films as applied to coatings is meant coatings up to a few microns in thickness.

However, while vacuum evaporation has generally been successful and provided a solution to many of the problems heretofore confronting the thin film depositor, certain problems still remain to be solved. One such problem which has plagued those attempting to vacuum evaporate thin films involves a phenomenon which now by common usage has come to be called "spitting." "Spitting" occurs and is manifested by the uncontrolled and unpredictable expulsion of solid, unvaporized particles from the evaporant mass. This sudden and explosive emission of solid particles of evaporant from the source causes the thin film coating to be nonuniform and blemished, and the surface of the article to be pitted. If, for example, the thin film in question is a dielectric film separating two capacitor electrodes, the pitted dielectric film will result in a short circuit between the electrodes thereby rendering useless the electronic element attempted to be fabricated. In this example, the spitting has produced in the coating what is commonly known as a "pinhole" which serves to short circuit the two capacitor electrodes. However, pinholes are not the only undesirable results of spitting. Other defects include nonuniformity of coating thickness, reduced adherence of the coating to the supporting substrate, just to name a few. Spoilage of the work due to pinholes, nonuniformity, etc., results in rejection and frequently results in the total loss of the articles being coated. More importantly, such spoilage if not detected in individual tests conducted on the coated article itself results in the inclusion of the imperfect article in an electronic assembly, the entire assembly of which must ultimately be scrapped.

The majority of prior art attempts to obviate the above-mentioned spitting problem have met with limited success. Examples of such attempts include the placing of heated coils, porous elements, screens or combinations thereof above an evaporant-containing crucible. It was thought that by these methods the solid, unvaporized particles would be intercepted by the apparent obstruction placed in their path and not permitted to pass on up to the substrate without first receiving the heat of vaporization. However, such attempts failed to take into account the relatively small size of the escaping particles with respect to the unobstructed passages that existed in the filtering medium. For example, the finest mesh screen available has spaces therein of the order of 7 microns on an edge. Considering that the molecular size of silicon monoxide, a common evaporant, is of the order of approximately 0.001 micron, it becomes clear that an agglomeration of such molecules, i.e., a particle, while having a size in excess of 0.001 micron, will nowhere near approach the size of a 7 micron hole and have even less of a chance of exceeding it. Thus, it is seen that filtering schemes of the above type designed to avoid spitting are at best unsatisfactory and unable to materially reduce spitting.

Another common method to reduce the prevalence of spitting involves the placing of heated baffles above the crucible. However, devices using this means to avoid spitting, while enjoying greater success than the filtering schemes mentioned earlier, are subject to a number of disadvantages. Specifically, these schemes have a tendency to choke off the flow of vapor. They also require a large evaporation distance to obtain uniform coatings, i.e., to obtain desirable distribution patterns. By the term evaporation distance is meant the distance from the source to the surface being coated. Thus, the reduction in spitting with sources of this type are obtainable only at the expense of vapor flow rate and distribution pattern.

Perhaps the most successful prior art attempt to reduce spitting is that which involves the placing of a perforated tubular heating element vertically in the granular evaporant charge with the upper end protruding from the top surface of the charge. The vapors which form adjacent to the outer surface of the heating element pass through the perforations and on up through the tube to the substrate. However, such sources, while realizing reductions in spitting, require large evaporation distances if any kind of usable distribution pattern is to be obtained. Experience has shown that such large evaporation distances necessarily result in wasteful deposition of the vapors due to the tendency of a large proportion of the vapors to be deposited elsewhere than on the substrate itself. This type of wasteful deposition which is a necessary concomitance of large evaporation distances becomes a new source of "particulate dirt" when it flakes from relatively cool vacuum system parts to which it adheres poorly.

A further disadvantage of such tubular heating device is that spitting is not altogether avoided since it is possible for some solid particles to pass through the perforations and emerge from the mouth of the tube without receiving the heat of vaporization. This is so because direct line-of-sight paths exist between the perforations and the mouth of the tube which enable a particle to pass unobstructed to the substrate. Also, particles may take on vertical velocity through collisions with other moving evaporant without taking on sufficient energy to dissociate. Thus, it is seen that even this method does not provide an entirely satisfactory solution to the spitting problem.

The terms "evaporant" and "evaporant charge" as used herein are meant to include only those materials which sublime and to exclude all those coating materials which in changing from a solid to a vapor pass through a liquid phase. Similarly, the term "evaporation" as used herein is limited to the phenomenon of sublimination and does not include vaporizing processes, wherein the material passes through a liquid phase.

It is therefore an object of this invention to provide an improved vapor deposition source which obviates the above-noted shortcomings of the prior art.

It is another object of this invention to provide a new, useful, and simple vapor deposition source which facilitates the deposition of uniformly distributed patterns of thin films without spitting.

It is a further object of this invention to provide an improved vapor deposition source which deposits at a high rate, yet does not emit solid, unvaporized particles of evaporant therefrom.

It is an additional object of this invention to provide an improved nonspitting vapor deposition source which generates vapor at a uniform controllable rate throughout the entire period of vaporization of a single evaporant charge.

Yet still another object of this invention is to provide an improved nonspitting vapor deposition source which has a high capacity and, therefore, does not require frequent recharging.

A still further object of this invention is to provide an improved vapor deposition source which efficiently utilizes input power.

An additional object of this invention is to provide an improved nonspitting vapor deposition source which does not require a highly comminuated charge.

A still further object of this invention is to provide an improved nonspitting source which can be easily and inexpensively manufactured.

It is another object of this invention to provide an improved nonspitting source which is rugged and durable in construction.

It is yet another object of this invention to provide an improved nonspitting vapor deposition source which deposits vapor onto a supporting substrate with a minimum of waste.

Still another object of this invention is to provide an improved vapor deposition source with which reproducible and predictable film properties can be obtained.

Therefore, in accordance with one aspect of this invention, a vapor deposition source device is provided which comprises a substantially closed vessel so constructed as to have a vapor chamber and an evaporant charge chamber which are separated by a perforated member whereby an electron emitter which is held at a negative potential with respect to the vessel and which is located within the vapor chamber, in addition to raising the source device to its operating temperature, also provides an electron cloud therein which causes all unvaporized particles of evaporant emitted to the vapor chamber through the perforated member to become electrically charged, forced to a hot electrode by an electric field, and vaporized prior to emission from the vapor chamber through an aperture provided therefor.

In accordance with another aspect of this invention, a vapor deposition source device is provided which is so constructed as to have an inner vapor chamber and an outer evaporant charge chamber substantially surrounding the inner chamber and separated therefrom by a perforated lateral member whereby a thermionic filament located within the inner chamber and held at a relatively negative potential in addition to raising the source device to its operating temperature, also provides an electron cloud therein which causes all unvaporized particles of evaporant emitted to the inner chamber through the perforated lateral member to become electrically charged, forced to a hot electrode by an electric field, and vaporized prior to emission from the inner chamber through an aperture provided therefor.

In accordance with a more detailed aspect of this invention, a vapor deposition source device is provided which is so constructed as to have an inner cylindrical chamber and an outer annular evaporant charge chamber substantially surrounding the inner cylindrical chamber and separated therefrom by a cylindrical screen whereby a thermionic filament located within the inner cylindrical chamber and held at relatively negative potential, in addition to raising the source device to its operating temperature, also provides an electron cloud therein which causes all unvaporized particles of evaporant emitted to the inner cylindrical chamber through the screen to become electrically charged, forced to a hot electrode by an electric field, and vaporized prior to emission from the inner chamber through an aperture provided therefor.

In accordance with a still further aspect of this invention, a vapor deposition source device is provided in accordance with the foregoing principles which utilizes heat baffling means to improve the source device efficiency.

Numerous advantages have been found to flow from the use of the vapor deposition source of this invention. For example, the source reaches its operating temperature equilibrium point with a minimum of delay following turn-on. Furthermore, once this equilibrium is established, the source generates vapors at a uniform rate until nearly all the evaporant charge is consumed. Another feature if this invention which should be noted is that in the course of consuming the charge, little or no solidified evaporant accumulates at the source aperture to thereby reduce the effective size of the aperture and restrict the flow of vapors. A feature which also deserves mention is that this source can be used with conventional vacuum deposition auxiliary equipment and therefore its use involves little additional expense.

The foregoing and other objects, features, and advantages of this invention will be apparent from the following more particular description of a preferred embodiment, as illustrated in the accompanying drawings.

In the drawings wherein like reference numerals refer to like parts throughout the several views;

FIG. 3 is a vertical section through the evaporant charge chamber of the source which is shown slightly enlarged and depicts the orientation of the evaporant charge with respect to the chamber before the source is turned ON.

*Detailed description*

Figure 1:
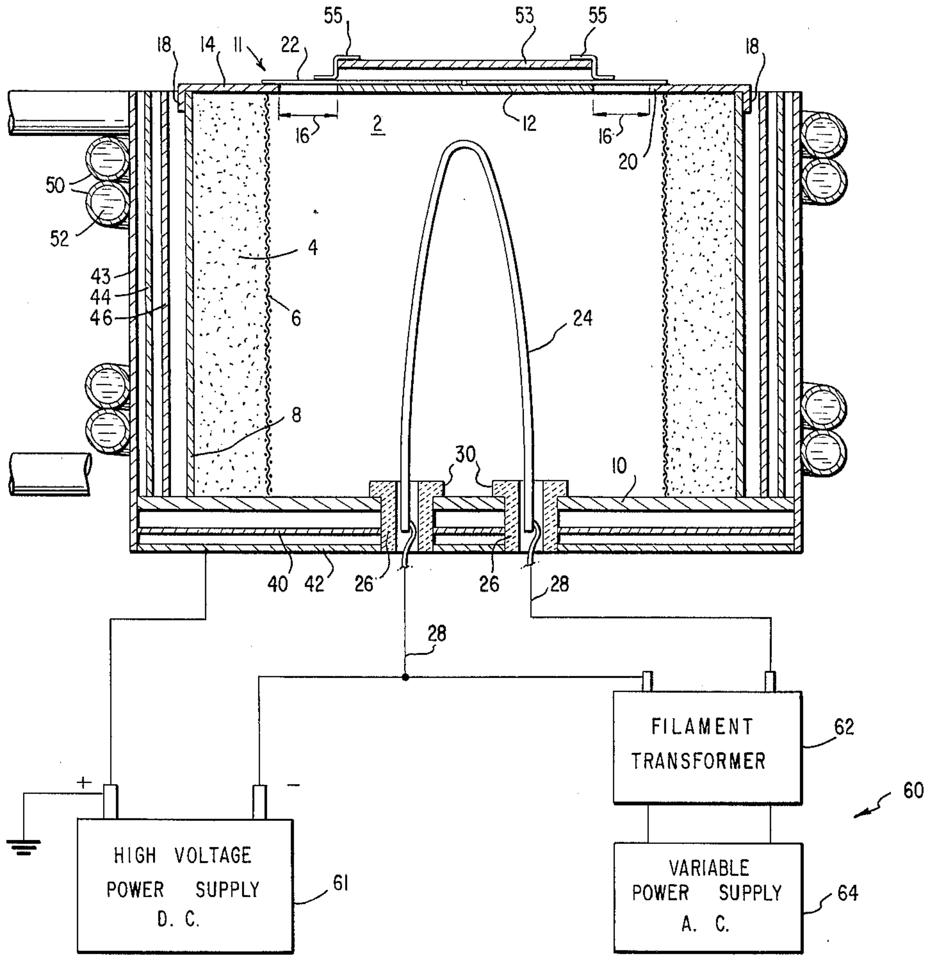
FIG. 1 is a vertical section through a preferred vapor deposition source showing the details and relationships of the varous structural elements which comprise the source.

Referring now to FIG. 1, a sketch is provided of a preferred embodiment of a vapor deposition source constructed in accordance with this invention. The source basically comprises an inner lateral body member or cylindrical wall 6 surrounded by an outer body member or cylindrical wall 8 of larger diameter. Together these two walls 6 and 8 serve to divide the source into two separate chambers. The first of these chambers, a vapor chamber 2, is the central, hollow cavity defined by the cylindrical wall 6. It is from this chamber 2 that the vapors are emitted from the source. The second of these chambers, the evaporant charge chamber 4, is the annular cavity defined by the inner cylindrical wall 6 and the outer cylindrical wall 8. It is into this chamber 4 that the evaporant charge is placed. The inner cylindrical wall 6 is made of fine mesh screening material, preferably of tantalum. The screening material may be of any commercially available type and may, for example, be screening having 150 meshes per linear inch. However, the mesh size is not critical and may be larger if finer meshes are not readily available. The only real requirement with respect to the screening aperture size is that the size of the meshes be small enough to prevent the granules of evaporant charge from passing through the screen into the chamber 2. The outer cylindrical wall 8 is made of metal sheet, preferably tantalum sheet having a thickness of 5 mils. Both the inner cylindrical wall 6 and the outer cylindrical wall 8 are structurally joined at their lower edges to a lower body member, a disc-shaped metal base or bottom 10. The base 10 is preferably constructed of 10 mil tantalum sheet stock being made somewhat thicker than either of the walls 6 or 8 for purpose of rigidity. The diameter of the base 10 it will be observed is somewhat larger than that of the outer cylindrical wall 8. The reason for this larger size will become evident hereinafter. The structural joint between the lower edges of the two walls 6 and 8 and the base 10 may be of any permanent type and may, for example, be a weldment.

An upper body member or top, generally designated by the numeral 11, comprising a vapor chamber cover 12 and an evaporant charge chamber cover 14, is provided to substantially enclose the two chambers 2 and 4. The evaporant charge chamber cover 14 is an annular piece of 5 mil tantalum sheet stock having a depending flange 18 which serves to grip the outer surface of the wall 8. The inner peripheral edge 20 of the cover 14 extends radially inward a slight distance past the upper edge of the inner wall 6. The cover 14 it will be observed, seats on the upper edges of the walls 6 and 8. This seating arrangement coupled with the depending flange 18 and the radially inwardly extending edge 20 of the cover 14 serves to seal the annular opening of the evaporant charge chamber 4. The cover 14 which seals the evaporant charge chamber 4 is removable to enable the evaporant charge to be placed within the chamber 4.

Figure 2:
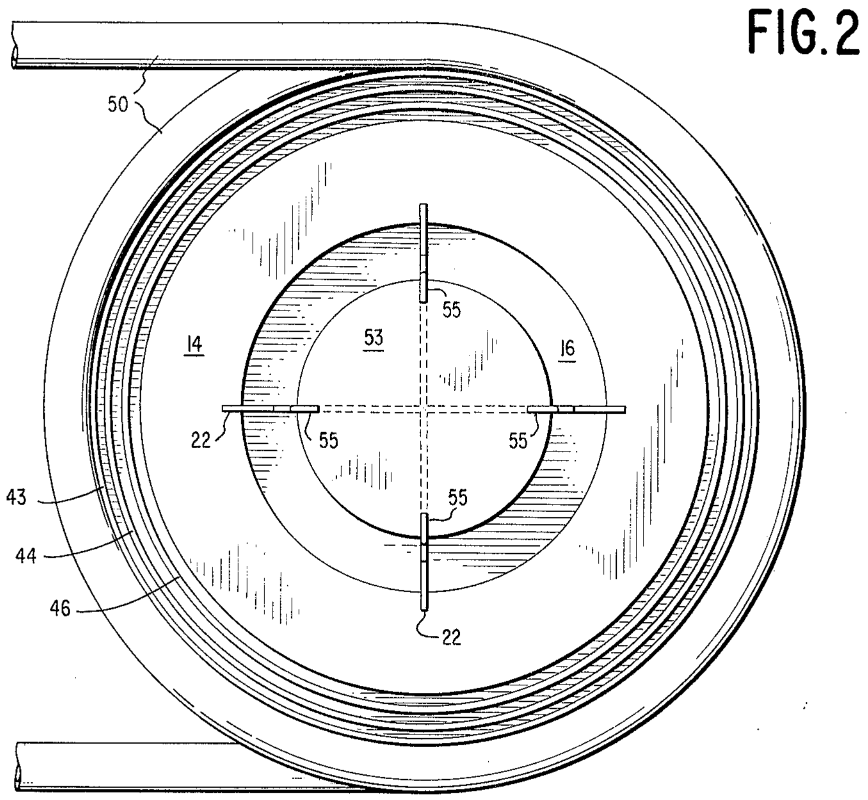
FIG. 2 is a top view of the source shown in FIG. 1.

The vapor chamber cover 12 is in the form of a disc made of 5 mil tantalum sheet stock. The diameter of the cover 12 is approximately ⅜" less than the diameter of the inner cylindrical wall 6. This abbreviated diameter of the cover 12 leaves an annular opening or aperture 16 between the peripheral edge of the cover 12 and the inner peripheral edge of the cover 14. It is from this aperture 16 that the vapors pass from the vapor chamber 2 of the source up onto the article being coated. As shown in FIG. 2, a pair of horizontal orthogonal tantalum wires 22, shown diametrically bridging the annular evaporant charge cover 14, serves to locate and secure in place the vapor chamber cover 12 with respect to the annular evaporant charge chamber cover 14. The wires 22 are structurally joined to both the covers 12 and 14 in any suitable manner, for example, by a weldment.

A thermionic filament 24 is centrally located within the vapor chamber 2. Thermionic filament 24 may be of any conventional type and may, for example, be a 40 mil diameter tungsten wire. The only real requirement for the thermionic filament is that the temperature at which it emits be below its melting point. As to the shape of the filament, it has not been found to be critical and, although an inverted hairpin-shaped filament is preferred, many other shapes have been found to produce satisfactory results. The ends of the filament 24 are anchored in a pair of identical insulative collars 26 fitted into holes in the base 10. The insulative collars 26 are each provided with axial holes therethrough to accommodate the ends of the filament 24. Each of the collars 26 is also provided with a radially extending flange 30, the lower surface of which seats on the base 10 and prevents it from falling therethrough. The collars may be made of any suitable refractory material and may, for example, be of boron nitride. The ends of the filament 24 are connected by lengths of heavy gauge flexible electrical wire 28, to an A.C. power supply 60 which will be described in detail hereinafter. The connection between the wires 28 and the filament 24 may be accomplished in any convenient manner.

Up to this point what has been described is the basic vapor deposition source structure which comprises the inner wall 6, the outer wall 8, the vapor chamber cover 12, the evaporant charge chamber cover 14, and the filament 24 anchored in insulative collars 26 fitted into holes in the base 10. The following discussion will concentrate on the heat baffling arrangements provided in the preferred embodiment to improve the efficiency thereof.

Referring again to FIG. 1, it will be seen that two heat baffles 40 and 42 are provided beneath the base 10 of the source. The bottom baffles 40 and 42 are discs of 5 mil tantalum sheet stock which are joined to an outer cylindrical heat or side baffle 43 to be described hereafter. The joints between the periphery of the bottom baffles 40 and 42 and the side baffle 43 may be of any conventional type and, for example, may be weldments. The number and spacing of the bottom baffles 40 and 42 is not critical. Experience has shown that two bottom baffles spaced approximately ¹⁄₁₆" from each other and ⅛" from the base 10 will satisfactorily shield the heat radiated from the bottom of the source and maintain the base 10 at a desirable operating temperature. Holes are provided in the bottom baffles 40 and 42 roughly an alignment with similar holes in the base 10 for the purpose of accommodating the insulators 26.

The side baffle 43 together with heat baffles 44 and 46 shields the heat radiated from the sides of the source and maintain the inner and outer walls 6 and 8 at a desirable operating temperature. The side baffles 43, 44 and 46 are constructed of 5 mil tantalum sheet stock formed into concentric cylinders of slightly different diameter. Two of the side baffles 44 and 46, which surround the outer wall 8, are joined at their lower edges to the base 10. The third side baffle 43 surrounding the outer wall 8 is joined to the peripheral edge of the base 10. As was described before, the third side baffle 43 is also joined to the bottom baffles 40 and 42. The joints may be of any suitable type and may, for example, be a weldment. As noted above, the spacing and number of baffles used is not critical. Experience has shown, however, that three side baffles 43, 44 and 46 spaced approximately ¹⁄₁₆" apart sufficiently shield the heat radiated from the sides of the source and maintain the walls 6 and 8 thereof at a desirable operating temperature.

Surrounding the outermost side baffle 43 and in intimate contact therewith is a cooling coil 50. Any suitable fluid 52 may be used as a coolant and circulated through the coil 50 to remove heat therefrom. The coolant 52, after it has passed through the coil 50, is then passed through a suitable heat exchanger (not shown) where it is cooled and prepared for recirculation through the coil 50. The purpose of the cooling coil 50 is to remove heat radiated by the source which would ordinarily cause the pressure within a bell jar (not shown) to rise. Hence, it will be understood that the heat exchanger referred to above will advantageously be located without the bell jar.

Another heat baffle 53 is also provided. This top heat baffle 53 is positioned slightly above the vapor chamber cover 12 and can be held in place in any suitable manner. For example, lengths of tantalum wire 55 joined to both the top baffle 53 and the wires 22 have been found to be sufficient to secure the top baffle 53 in position. As before, the spacing and number of top baffles, which in this case is ⅛" and one, respectively, is not critical. It is only desired to shield the substrate being coated from heat radiated from the top of the vapor chamber cover 12, and to maintain the cover 12 at a desirable operating temperature thereby preventing condensation of the evaporant in the aperture 16.

The generation of vapors with a source constructed in accordance with this invention requires that both filament power and bombardment power be supplied to the source. The former type of power is supplied to the filament 24 via leads 28 from a power supply generally indicated by the numeral 60. The filament power requirement is dictated by the power necessary to raise the filament 24 to its emitting temperature, which for tungsten is in the neighborhood of from 2200° C. to 2500° C. Experience has shown that a filament power of 300 watts (10 volts, 30 amps) is sufficient to bring the filament 24 to an emitting state and maintain it in that state. This power is substantially dissipated in the form of heat inasmuch as the filament temperature is raised as a result of resistance heating effects. The filament power can be supplied by any suitable source 60 and may comprise, for example, a variable A.C. source 64 and a transformer 62. The only requirement for the transformer 62 is that it isolate the variable A.C. source 64 from the high voltage source used in conjunction with the bombardment power supply 61 hereafter to be described. The variable A.C. source 64 enables the current fed into the filament 24 to be controlled.

The other type of power essential to the operation of the source, bombardment power, is fed to the source from a high voltage power supply 61. The bombardment power requirement is dictated by the temperature to which it is desired to raise the rest of the source, i.e., the elements of the source excluding the filament 24 and the insulative collars 26. Principally, it is by heating the screen 6 that the evaporant charge contained in the chamber 4 is raised above its sublimation temperature. The positive terminal of the high voltage power supply 61, which is grounded, is connected to the lower heat baffle 42. The negative terminal of the supply 61 is connected to one of the filament leads 28. Thus, the filament is maintained at a potential negative with respect to the rest of the source. The effect of this potential difference between the emitting filament 24 and the rest of the source is to accelerate the emitted electrons from the filament 24 toward the screen 6, the chamber cover 12 and the base 10. The accelerated electrons bombard these electrically positive elements and thereby raise their temperatures. The heated screen 6, in a manner to be described in detail hereinafter, transfers heat to the evaporant charge in chamber 4 where the major portion of it becomes vaporized. The high voltage power supply 61 may be any conventional type and therefore need not be described in detail. Experience has shown that a high voltage power supply 61, which is capable of supplying 600 watts (2000 volts, 300 milliamps) provides sufficient bombardment power to the source to raise the evaporant charge to its sublimation temperature. Thus, the aggregate power requirements for the source total approximately 900 watts and comprise 300 watts of filament power and 600 watts of bombardment power.

*Operation*

Figure 4:
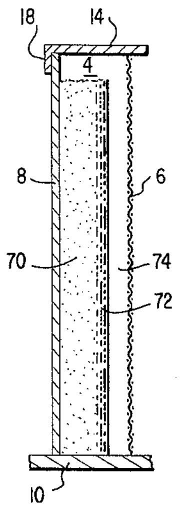
FIG. 4 is a vertical section through the evaporant chamber of the source which is shown slightly enlarged and depicts the orientation of the evaporant charge with respect to the chamber after the source has reached its operating equilibrium temperature.

The preceding discussion has described the structure of a preferred vapor deposition source constructed in accordance with this invention. Now a discussion will be undertaken to describe the operation of the preferred embodiment. In utilizing this source it is first necessary to provide a charge of suitable evaporant material. Referring to FIG. 4 it will be seen that the source may be conveniently charged by filling the evaporant charge chamber 4. All that is necessary to accomplish this charging step is to remove the annular cover 14, which seals the evaporant charge chamber 4, and place the evaporant charge 70 therein. The evaporant charge 70, which may be any desired material that sublimes, need only be granulated to the degree necessary to enable it to fit within the annular chamber 4, i.e., the charge 70 need not be in a finely powdered form. The fine particles need not be removed from the charge material, however. With this charging step completed, the cover 14 is replaced and the bell jar (not shown) within which the source is placed is ready to be evacuated. The evacuation of the bell jar is accomplished using standard laboratory vacuum pumps. The extent to which the bell jar is evacuated depends on the material which is being sublimed. For example, if it is desired to deposit silicon monoxide, then the pressure in the bell jar should be reduced to the $10^{-5}$ Torr pressure region.

After the bell jar pressure has been reduced to the desired level, the power sources 60 and 61 may be turned ON. The filament power source 60 is adjusted so as to bring the filament to a state of thermionic emission. Generally, this has been found to require, if a tungsten filament is employed, raising the temperature of the filament 24 to the approximate range of from 2200° C. to 2500° C. The filament may be raised to such a temperature range by providing a filament power from filament power source 60 of approximately 300 watts (10 volts, 30 amps). The bombardment power source 61 is adjusted so as to cause the electrons emitted by the filament 24 to be directed onto the screen 6, the vapor chamber cover 12, and the base 10. It will be remembered that the filament 24 is at a negative potential with respect to the rest of the source structure. Therefore, the electrons emitted by the filament 24 will be accelerated toward the electrically positive vapor chamber walls 6, base 10, and top 12 thereby bombarding them and raising their temperature. While the lower limit for the bombardment voltage appears to be in the neighborhood of 1200 volts, there is no upper limit except that caused by ionization in the chamber. Stated differently, bombardment will occur as long as the bombardment voltage, i.e., the voltage between the filament 24 and the remainder of the source, is above 1200 volts and there is no ionization in the chamber. Ionization is to be avoided because it produces arcing. It will be understood by those skilled in the art that the bombardment voltage ceiling is limited by the pressure in the bell jar because it is this pressure that determines at what voltage ionization will take place. Experience has shown that an optimum bombardment power is approximately 600 watts (2000 volts, 300 milliamps). When such a bombardment power is supplied to the vapor deposition source from the bombardment energy source 61 the temperature of the evaporant, for example, silicon monoxide, will be raised to a point above its sublimation temperature. For a chamber pressure of approximately $10^{-5}$ Torr the sublimation point will be in the range of from 1200° C. to 1300° C. However, it will be understood by those skilled in the art that the temperature at which the evaporant sublimes is dependent on its vapor pressure.

The discussion of the operation of the source has so far concerned the charging of the source with an evaporant, in this case, silicon monoxide; the evacuation of the bell jar within which the source is placed; and the supplying of both filament power and bombardment power to the source. The following discussion will concern the operation of the source from the time power is supplied thereto.

Figure 3:
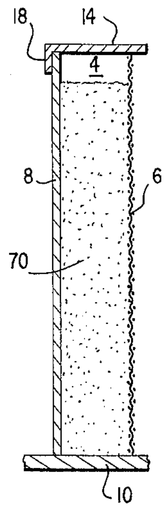

Referring to FIG. 3 a vertical section is depicted showing the evaporant 70 in the charge chamber 4 as it appears immediately before power of any type is applied to the source. It will be observed that the granulated charge 70 is in physical contact with the outer surface of the cylindrical screen 6 and that the entire charge is still in a granulated state. As soon as the power is supplied to the source, the temperature of the screen 6 begins to rise due primarily to bombardment thereof by the emitting filament 24. There is also some heat transfer to the screen 6 by radiation from the emitting filament 24, but it is of minor consequence in comparison to that produced by bombardment thereof. During the period when the source is approaching its equilibrium operating point, the granules of evaporant 70, which are in direct physical contact with the screen 6, are receiving heat from the screen 6 principally by conduction, although there is also some heat transfer by radiation. Heat transfer by conduction being substantially a high-rate heat transfer mechanism, the granules of charge 70 adjacent the screen 6 are vaporized at a high rate. However, referring to FIG. 4, it will be seen that as the granules 70 adjacent the screen 6 vaporize, a slight space 74 develops between the granules of charge 70 and the screen 6. At this point, the heat transfer to the charge 70 is principally by radiation since the charge is no longer in direct physical contact with the hot screen 6. The transformation from the conduction mode of heat transfer to the radiation mode of heat transfer results in a more uniform heat transfer from the screen 6 to the particles of the charge 70 that are exposed to the screen. Consequently, the rate of sublimation of the charge 70 is steadier and no longer a result of small explosions of a few particles in contact with the hot screen 6. From the beginning of vaporization, some of the vapors condense on the granules 70 nearest the screen 6 and form a glaze thereon. This glaze serves to bind the granules 70 which are closest to the screen 6 into a coherent layer 72 which is several mils thick. This layer 72 functions as a retaining wall to maintain the loose granules 70 in the disposition depicted in FIG. 4. As the source continues generating vapors, the layer 72 advances toward the outer wall 8 until nearly the entire charge is consumed. The thickness of the layer 72, however, remains substantially the same during the period of charge consumption. When the amount of evaporant charge typically consumed has been vaporized, a thin crust which formed on the inner surface of wall 8 during the evaporation period remains. This crust may be broken and allowed to remain in the charge chamber 4 and mixed with the new charge. This source provides for essentially 100 percent efficiency in consumption of the charge.

The vapors generated during the evaporation cycle pass out through the screen 6 into the vapor chamber 2. From the chamber 2 the vaporized granules pass on up to the article to be coated through the annular aperture 16 in the cover 11. The aperture, which conceivably could take any shape, has been found to provide an optimum distribution pattern if annular in shape. Such an annular aperture enables a substantially uniform pinhole-free coating having only a 10% thickness deviation to be obtained on a 2 inch square substrate at an evaporation distance of 4″. The short evaporation distances possible with this source result in practically waste-free depositions of thin films. The benefits of short evaporation distances wherein the amount of vapors wasted or "hung on the wall" is drastically reduced will be appreciated by those skilled in the art.

In addition to providing, with short evaporation distances, distribution patterns heretofore unobtainable with prior art sources, this source provides a uniform deposition rate substantially throughout the entire charge consumption period. As soon as the charge 70 recedes from the screen 6 forming the space 74, the deposition rate steadies and remains substantially constant throughout the entire charge consumption period. This is the case because a substantially constant area of charge 70 is exposed to radiation from the screen resulting in a substantially constant rate of vaporization. In practice it has been found to require only a few seconds following source turn-on before the charge 70 has receded from the screen 6 thereby steadying the vapor generation rate.

Another feature of the operation of this source is the ability to coat thin films without the spitting of solid unvaporized particles from the source onto the substrate. The absence of spitting is primarily attributable to a combination of two factors: (a) the electron cloud within the vapor chamber 2 and (b) the presence of two hot electrodes in the source. From the previous discussion, it will be remembered that the filament 24 is brought to its emitting state shortly after source turn-on, and proceeds to bombard the vapor cover 12, screen 6, and base 10, all of which are more positive with respect to filament 24. The result of this emission of electrons from the filament 24, in addition to heating up the source elements 6, 10 and 12, is that an electron cloud is established in the vapor chamber 2. It will also be realized that the filament 24, which is at a negative potential with respect to the source elements 6, 10 and 12, functions as a cathode; and, the positive source elements 6, 10 and 12 function as anodes. Now, with this information in mind a discussion of the mechanism responsible for the prevention of spitting will be undertaken.

It will be understood by those skilled in the art that some unvaporized evaporant particles comprising agglomerations of evaporant molecules will inevitably be emitted into the vapor chamber 2. It will further be understood that the random motion of the particles so emitted from the charge chamber 4 will ordinarily result in some of them being emitted from the vapor chamber 2. However, due to the combined presence of the two factors heretofore mentioned, namely, the electron cloud and the two hot electrodes, unvaporized particles emitted from the charge chamber 4 into the vapor chamber 2 do not escape therefrom without receiving the heat of vaporization. With a source constructed in accordance with this invention, for example, the source of the preferred embodiment depicted in FIG. 1, unvaporized particles passing through the screen 6 become charged due to the presence of the electron cloud. The particles may become either positively or negatively charged, but whatever charge they assume they will be accelerated toward one of the hot electrodes and become vaporized. For example, if a particle in the vapor chamber collides with a high velocity electron the collision will tend to remove an electron from the particle and leave it positively charged. The particle, now positively charged, will be accelerated toward the cathodic filament 24 where it will receive sufficient heat to vaporize it. If the particle collides with a slower velocity electron it will tend to take on an electron becoming negatively charged. Such a particle, now negatively charged, will be accelerated toward one of the anodic elements 6, 10 or 12 whereupon it will receive sufficient heat therefrom to become vaporized. Thus, it is seen how an unvaporized particle emitted into the vapor chamber 2 will, by colliding with an electron, become charged and accelerated toward a hot electrode whereupon it receives sufficient heat to become vaporized. Absent the combination of (a) the electron cloud to charge the emitted particles and (b) the hot electrodes to accelerate the particle thereto and supply sufficient heat to vaporize the particles so attracted, the emitted particles would be subject to being ejected by the source onto the substrate without first becoming vaporized.

Experience has shown that utilizing the source of the preferred embodiment, vapor deposition rates of 175 angstroms per second are consistently obtainable and yield uniform thin films free of pinholes or other defects. Of course, the vapor deposition rate is controllable by merely varying the bombardment power supplied to the source.

Additionally, experience has shown that there is no tendency, utilizing the source of the preferred embodiment, to develop an accumulation of condensed evaporant adjacent the aperture 16 to thereby restrict the aperture. Therefore, a steady, unchoked flow of vapors from the source is assured.

While the invention has been particularly shown and described with reference to a preferred embodiment thereof it will be understood by those skilled in the art that various changes in form and details may be made therein without departing from the spirit or scope of the invention. For example, the material for the source of the preferred embodiment has been described as being of tantalum. However, it will be understood by those skilled in the art that any material having a sufficiently high melting point may be used instead of tantalum. Additionally, throughout the description of the preferred embodiment silicon monoxide has been referred to as the evaporant charge. Of course, other materials which sublime may be utilized and they need not be dielectrics, but may be conductive materials.

We claim:

A vacuum deposition source comprising, in combination, an inner vapor chamber including:

a lower body member;

a perforated inner lateral body member joined at its lower edge to said lower body member;

an upper body member having apertures therein, said upper body member being joined to the upper edge of the inner lateral body member, to form the confines of the inner vapor chamber, the apertures of said upper body member communicating with said inner vapor chamber;

an outer lateral body member laterally spaced around said inner lateral body member and being joined at its upper edge to said upper body member and at its lower edge to said lower body member;

an evaporant charge chamber defined by said inner and outer lateral body members, to contain particulate matter therein;

a thermionic filament located within the vapor chamber, being electronically insulated from the confines of said vapor chamber;

a dual purpose power source connected to the thermionic filament and to the confines of the inner vapor chamber to maintain said thermionic filament at its electron emission temperature, causing vaporization of the particulate matter contained in the evaporant charge chamber; and to maintain said confines of the inner vapor chamber at a positive potential with respect to said thermionic filament and to also maintain said thermionic filament as a secondary heating source of said confines of said vapor chamber; said vapor chamber being heated to vaporize any unvaporized particulate matter which may emanate into said vapor chamber through the perforations of the inner lateral body member, the vapors passing out of said vapor chamber by way of the apertures of the upper body member;

heat baffle means disposed about the outer confines of the inner vapor and evaporant charge chambers to shield against heat radiation therefrom.

References Cited by the Examiner

UNITED STATES PATENTS

| | | | |
|---|---|---|---|
| 2,998,376 | 8/1961 | Smith | 118—49 |
| 3,117,210 | 1/1964 | Herb | 118—49 |
| 3,129,315 | 4/1964 | Radke et al. | 219—271 |
| 3,153,137 | 10/1964 | Drumheller | 118—49.1 |

FOREIGN PATENTS

| | | |
|---|---|---|
| 766,119 | 1/1957 | Great Britain. |

MORRIS KAPLAN, *Primary Examiner.*